Sept. 4, 1923.

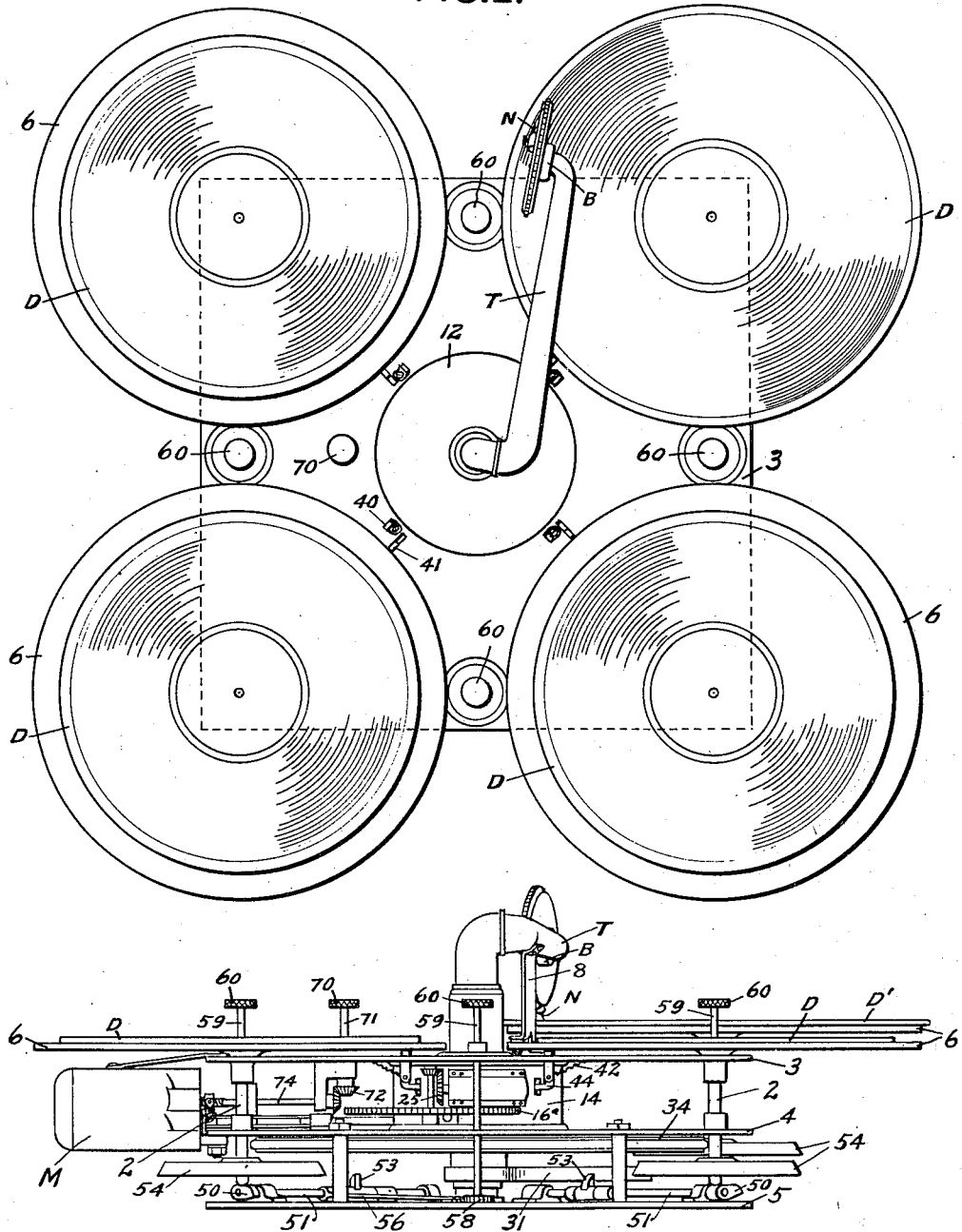

W. H. DAILY 1,466,791

AUTOMATIC MULTIPLE RECORD PHONOGRAPH

Filed July 25, 1922    5 Sheets-Sheet 2

INVENTOR
WM. H. DAILY
BY Hazard & Miller
ATT'YS.

Sept. 4, 1923.  
W. H. DAILY  
1,466,791  
AUTOMATIC MULTIPLE RECORD PHONOGRAPH  
Filed July 25, 1922   5 Sheets-Sheet 3
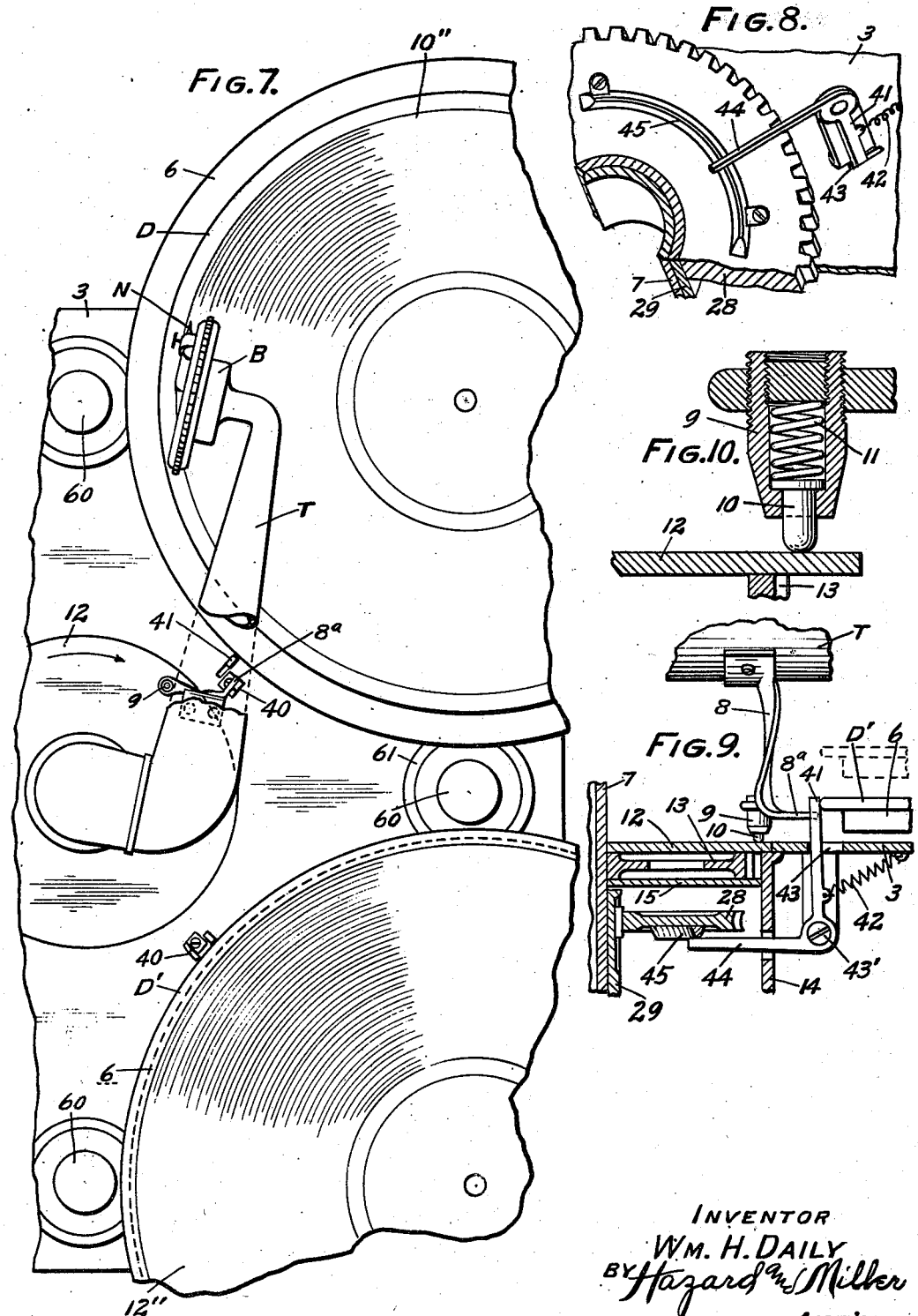
INVENTOR  
WM. H. DAILY  
BY Hazard and Miller  
ATT'YS.

Sept. 4, 1923.

W. H. DAILY

AUTOMATIC MULTIPLE RECORD PHONOGRAPH

Filed July 25, 1922    5 Sheets-Sheet 4

INVENTOR
WM. H. DAILY
BY Hazard & Miller
ATT'YS.

Sept. 4, 1923.
W. H. DAILY
1,466,791
AUTOMATIC MULTIPLE RECORD PHONOGRAPH
Filed July 25, 1922    5 Sheets-Sheet 5
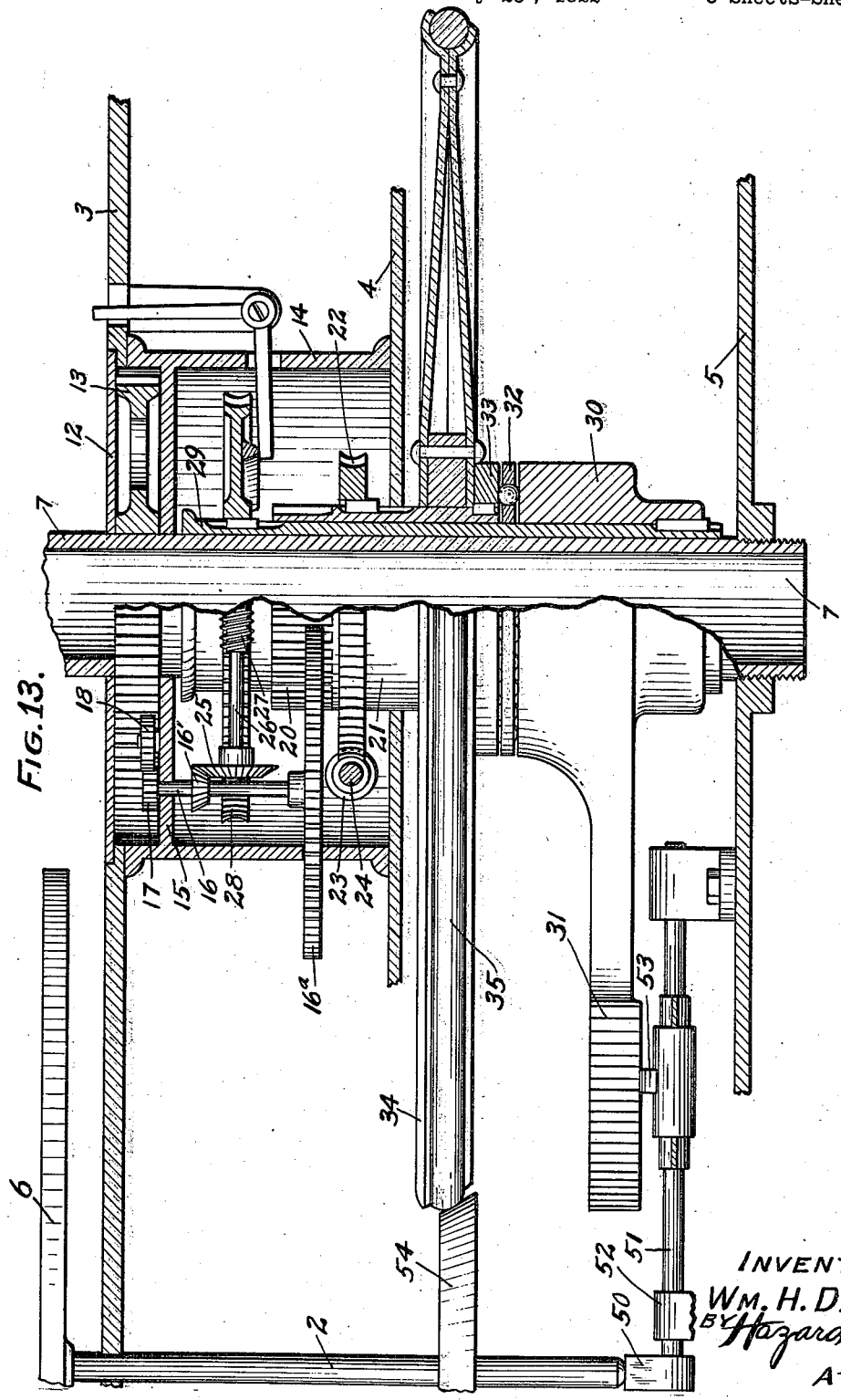
INVENTOR
WM. H. DAILY
BY Hazard & Miller
ATT'YS.

Patented Sept. 4, 1923.

1,466,791

UNITED STATES PATENT OFFICE.

WILLIAM H. DAILY, OF LOS ANGELES, CALIFORNIA.

AUTOMATIC MULTIPLE-RECORD PHONOGRAPH.

Application filed July 25, 1922. Serial No. 577,324.

*To all whom it may concern:*

Be it known that I, WILLIAM H. DAILY, a citizen of the United States, residing at Los Angeles, in the county of Los Angeles and State of California, have invented new and useful Improvements in Automatic Multiple-Record Phonographs, of which the following is a specification.

This invention relates to phonographs and more particularly to phonographs of the type involving a plurality of record-carrying tables, such, for instance, as is shown in my Patent, Number 1,168,606, dated January 18, 1916.

It is an object of the present invention to provide a simplified form of construction and mechanism playing one after another of a plurality of records. Another object of the invention is to provide a rotating reproducer toward and from which the records are automatically lifted for the playing of the records. Another object of the invention is to provide means for determining the proper moment at which the records will be lifted into co-action with the stylus of the sound box and which will determine the position at which the needle or stylus registers with the record. Another object of the invention is to provide means for automatically determining the instant at which the record will be disengaged from the stylus and to provide manually operative means for accurately adjusting the said regulating means. Another object is to provide a means for automatically stopping the mechanical rotation of the tone arm of the phonograph at certain positions, according to the size of the record, and to provide means for locking the stopping means in a set position. Other objects of the invention will be made manifest in the following specification of an embodiment of the invention illustrated in the accompanying drawing wherein:

Figure 1 is a plan of the improved phonograph.

Fig. 2 is a side elevation with the walls of the box removed to clearly disclose the mechanism of the machine.

Fig. 7 is a plan of a fragment of the machine, parts being broken away to indicate the tone arm leg engaging a stop dog.

Fig. 8 is an underneath perspective of one of the yielding stop dogs.

Fig. 9 is a detail, sectional view showing the yieldable dog shifted to outer position and locked temporarily against retraction.

Fig. 10 is a detail, sectional view of the tone arm foot bearing on the tone arm carrier.

Fig. 13 is a large scale vertical section and side elevation of the gearing which operates relative mechanisms in the machine.

Figure 3:
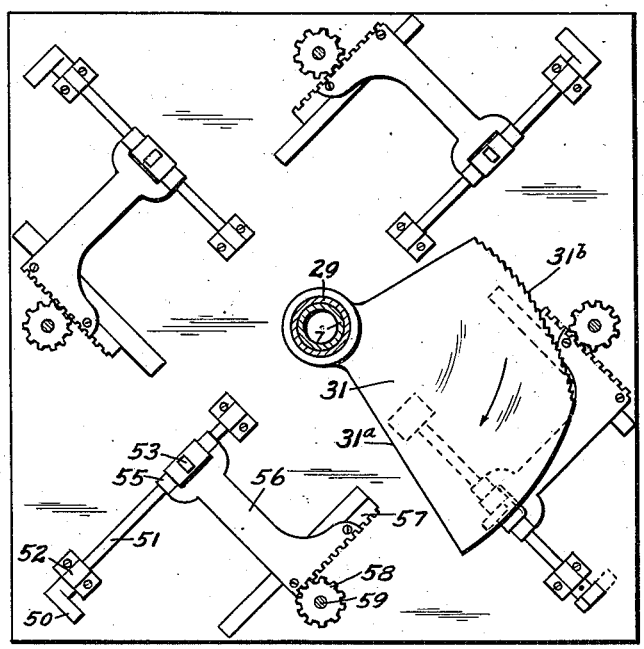
Fig. 3 is a plan partly in section, showing the adjustable slides for regulating the table elevation and showing the tripping quadrant.

The invention is embodied in a machine having a plurality of vertical spindles 2, which are suitably journaled in superposed frame plates 3 and 4; and below these is a bottom plate 5. The spindles extend up through the top plate 3 and each is provided with a suitably sized turn-table 6; the spindles being arranged in a common circle and holding the tables in a common plane when retracted. Each of the tables is designed to receive a phonographic record disc D of the usual size, namely ten and twelve inches.

Arranged in the geometrical center of the group of turn-tables is a vertical tone arm column 7, which is suitably secured to the bottom plate 5. The tone arm T carrying the sound box B is pivoted on the top of the column 7 to freely swing about the same; the column 7 forming a continuation of the sound tube and leading to any horn or other amplifying outlet chamber not shown.

The tone arm T is provided with a downwardly extending leg 8, which has an adjustable socket 9 carrying a yieldable support 10, which is normally pressed downward by a spring 11 in the socket 9. This device forms a foot on the lower end of the leg, the pin 10 preferably having a rounded bearing point, which is normally supported on top of a rotating carrier 12 surrounding the arm column 7 and rotating thereabout. The carrier 12 is in the form of a plate or flat ring and is fixedly attached to a gear 13 disposed below the carrier 12 in a stationary barrel 14 fixed between the top plate 3 and the intermediate plate 4; the carrier 12 being countersunk in the top plate 3 as shown in Fig. 13.

In the barrel 14 is a bearing shelf 15 or other suitable part, in which is journaled the upper end of a vertical shaft 16, to which is secured a pinion 17. The pinion 17 engages an intermediate gear 18, which engages and constantly drives the carrier gear 13.

The shaft 16 has secured to it a large gear wheel 16ᵃ and this engages a gear 20, forming a portion of a sleeve 21, upon which is keyed a worm-wheel 22.

The worm-wheel is engaged by a worm 23, fixed on the motor shaft 24, which extends horizontally and is driven by a suitable motor M.

The shaft 16 is therefore driven by the gear 20 and it carries a beveled gear 16' engaging a gear 25 secured on a horizontally extending shaft 26, which is provided with a worm 27 constantly engaging a worm-wheel 28. This worm-wheel is keyed on the hollow shaft 29, rotatably mounted on the fixed tone arm column 7.

Figure 11:
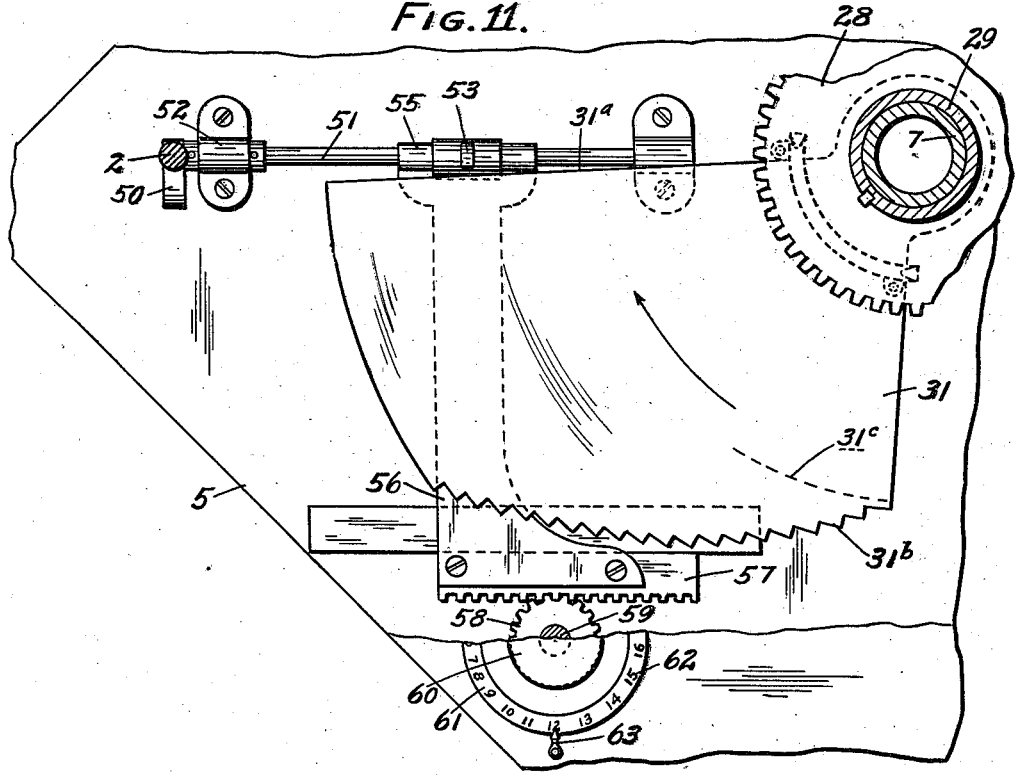
Fig. 11 is a plan showing in detail the tripping quadrant and one of the elevator shafts about to be actuated thereby, and showing in detail means for shifting the elevating shaft slide.

The hollow shaft 29 passes through and forms a bearing for the sleeve 21, and on the lower end of the hollow shaft 29 there is keyed the hub 30 of a tripping device in the form of a quadrant 31, Fig. 11.

On the hub 30 is provided an anti-friction bearing 32, and upon this rests a ring 33 keyed on the lower end of the sleeve 21. Fixed to the ring 33 and sleeve 21 is a horizontally arranged master, turn-table driving wheel 34 of any suitable construction, and the rim of which is preferably provided with an efficient friction face, as a rubber or leather ring 35. From the above it will be seen that power from the motor is transmitted to the drive-sleeve 21 and from this the master-wheel is driven and also the gear 16ᵃ is driven, and the gear 16ᵃ, by means of its shaft 16, drives the carrier gear 13 and the carrier, thus providing a simple, substantial, reliable and accurate transmitting mechanism for various parts, as will be described.

The various record turn-tables 6 are adapted to be raised from a common plane, when in retracted position to an effective position to move the records successively into engagement with the needle in the sound box. The tone arm and the sound box move constantly in a fixed horizontal plane while being supported by the rotating carrier 12. However, it is possible to lift the tone arm T on a horizontal axis if necessary.

The tone arm carrier rotates at a given rate of speed so as to swing it from one disc to another in ample time to be positioned above the disc on each table before the table is elevated. Since it is possible to utilize two sizes of discs on the tables, it is necessary to provide means for accurately defining the stopping position of the tone arm at predetermined locations so that it will properly register with the starting curve of a disc of either size. To that end there is provided in the top plate 3, just outside of the rim of the carrier 12, a plurality of sets of dogs, each set including a pair. One of the dogs, as 40, of each pair is stationary and stands vertically in the path of a toe 8ᵃ of the foot portion of the leg 8. This toe is so positioned as to engage successively the fixed dogs 40 as the tone arm is swung around by the carrier 12 in the direction of the arrow thereon, Fig. 7. The dogs 40 are so positioned with respect to the axis of the carrier 12 and as to the axes of the spindles 2 that the tone arm T will be stopped by each dog 40 in such position as to present the needle N of the sound box so as to properly register with the starting groove of a 10″ record. Since a 12″ record has its starting groove of a greater diameter than the starting groove of a 10″ record, it is desirable and necessary to position the arm T at successive locations over each disc turn-table 6 as to register with the initial groove of a 12″ record. To that end it is necessary to provide a dog 41, which can be shifted into effective position to engage with the swinging toe 8ᵃ of the tone arm and thus stop it with the needle N in position to engage the starting groove of a 12″ record. This adjustable dog 41 is normally moved to a retracted and clearing position, as, for instance, by means of a spring 42 attached to the top plate 3, which is slotted at 43 to receive the upwardly extending arm or dog 41 to which the spring is attached. Each dog 41 is pivoted on a support 43' and carries a horizontally extending arm 44 projecting in under the gear wheel 28, Fig. 9. This wheel is provided with a dog-locking rail 45 of such length as to move over the arm 44 and hold it to maintain the dog 41 in the set position against the retraction of the spring 42. The dog 41 is thrown to its outer position in the path of the toe 8ᵃ by the application of a 12″ record D', Fig. 9. Should the dog 41 be released from contact with a record while the rail 45 is in engagement with the arm 44, it will be seen that the dog would still be in the set and intercepting position.

From the above it will be seen that there is provided for each turn-table 6 a pair of dogs 40 and 41, spaced from each other in such position that when the adjustable dog 41 is released, the swinging tone arm will be stopped by the fixed dog 40 and therefore position the needle for a 10″ record without interference of the adjustable dog. Application of a 12″ record to a turn-table sets adjustable dog 41 so that it will stop the tone arm for a 12″ record.

Figure 4:
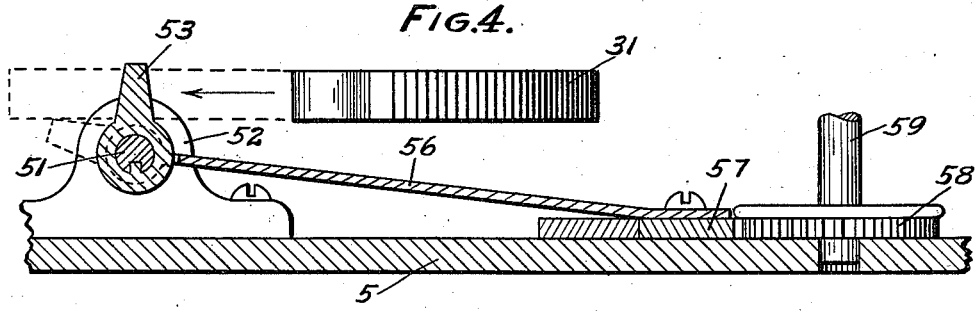
Fig. 4 is a vertical section on a larger scale, showing in detail the slide shifting mechanism and a portion of the tripping quadrant.
Figure 5:
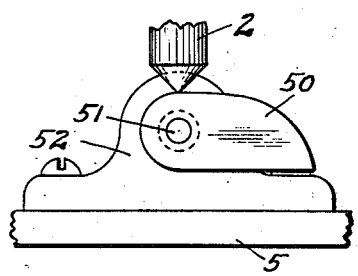
Fig. 5 is an end view of the elevating cam shaft with the elevating cam, and showing a portion of the turn-table spindle in lower position.
Figure 6:
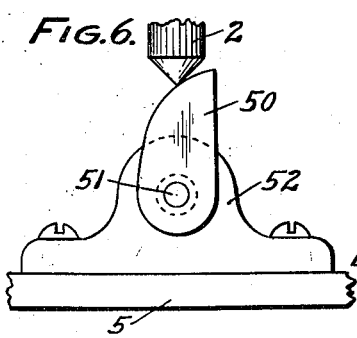
Fig. 6 is a similar view showing the spindle in elevated position.

The tables are elevated in the following manner: The lower end of each spindle 2 is designed to bear upon a cam 50 of suitable design and which is fixed on a cam shaft 51, mounted in suitable bearings 52 on the bottom plate 5 of the frame; there being a cam shaft 51 for each turn-table spindle 2. Each cam shaft has splined thereon a tripping lug 53, normally projecting upwardly as in Fig. 4, to be engaged by the slowly rotating tripping quadrant 31 above described. As the quadrant engages the tripping lug 53 on a cam shaft, the latter is rotated and the tripping lug tilted to the dotted line position, Fig. 4, concurrently with which action the cam 50 of the shaft 51 turns from a horizontal to an upright position, and therefore carries the turn-table spindle thereof of upwardly and shifts the record on the respective turn-table into effective engagement with the needle N of the sound box which has been previously swung into its proper position by its carrier 12. The upward movement of the turn-table spindle 2 is gradual so as to prevent injury to the record and to the needle.

After the disc has been elevated to the proper position, it is then rotated. Rotation is secured by means of the master-wheel 34. which is of such diameter as to engage with one another of a series of pulley wheels 54, of which there is one on each shaft or spindle 2 of the turn-tables. As the pulley wheels 54 move upwardly, after the needle of the sound box has engaged the record, the wheels contact with the driving face 35 of the master pulley or driving wheel 34 and rotation of the turn-tables is started.

Since records are of different lengths of grooves, it is desirable to provide for automatic disengagement of the driving pulleys 54 from the master-wheel 34 as soon as the reproduction of the record has been completed, irrespective of the length of the grooves on the various records. Therefore stopping means are provided and which here include the tripping quadrant 31. This, quadrant, as above explained, engages, successively, the cam shaft lugs 53. To determine the period of co-action between a turn-table pulley 54 and the driving wheel 34, the cam shaft lug 53 is provided for longitudinal adjustment along its shaft 51 and this adjustment is secured by a slide 55 mounted on each shaft 51 and from which slide extends an arm 56, which is attached at its outer end to a rack 57, engaging a pinion 58, secured on a setting shaft 59, having a setting knob 60 at its upper end. Each setting shaft is provided with a dial 61, given suitable index numbers 62, which may be turned into register with an index or pointer 63. By preliminary examination the length of the record groove on each record disc is ascertained and it is given an index number corresponding to one of the index numbers 62 on the setting dials 61. When a record disc of a given index number is applied to any of the tables, the setting shaft 59 is operated by its knob to shift the rack 57 to such a position as desired, according to the index. This adjustment shifts the tripping finger 53 on a cam shaft 51 radially with respect to the axis of rotation of a quadrant 31. This has a leading or front edge 31ª, which is radial to the center of the quadrant so that all of the lugs 53 are engaged at any position thereof along the front edge of the quadrant. The rear trailing edge of the quadrant is shown as provided with a plurality of let-off steps or shoulders 31ᵇ, which are each placed concentrically and offset radially as to the axis of rotation of the quadrant 31. Therefore, as here shown, the outermost let-off shoulder 31ᵇ of the quadrant provides for the shortest arc of contact between the leading edge 31ª of the quadrant and the said outermost let-off shoulder 31ᵇ. This, therefore, provides for the release of a cam shaft lug 53 after the shortest period of contact of the quadrant 31 with the lug 53 as for reproduction from a short record. In such case the lug 53 is previously adjusted to its outermost position by the slide 55 when the index shaft 59 is set. Any longer records will require the inward adjustment of the slide 55 and of a lug 53 according to its given index number and the setting of the index shaft 59; the longest record requiring the adjustment of the lug 53 to its innermost position so that it will remain in contact with the tripping quadrant 31 for the longest period as determined by the length of the longest arc contacted at 31ᶜ.

While the needle is in engagement with a record it is propelled thereby and as soon as the record is retracted upon disengagement of a cam lug 53 from the traveling quadrant 31, then the foot pin 10 is again lowered to the rotating carrier 12 and this with reasonable speed carries the tone arm T around until it is engaged by one or the other of the dogs 40—41, at which place the tone arm will be stopped, while somewhat lowered, and will then be again slightly lifted as soon as the constantly traveling quadrant 31 engages the next succeeding cam shaft tripping lug 53, with a consequent elevation of the respective turn-table and disc thereon and the engagement of the disc with the needle. Such engagement results in a slight elevation of the tone arm and sound box to provide for the desired degree of pressure of the needle on the record.

This successive and automatic operation of the various records will be repeated continuously so long as power is derived from the motor M.

Figure 12:
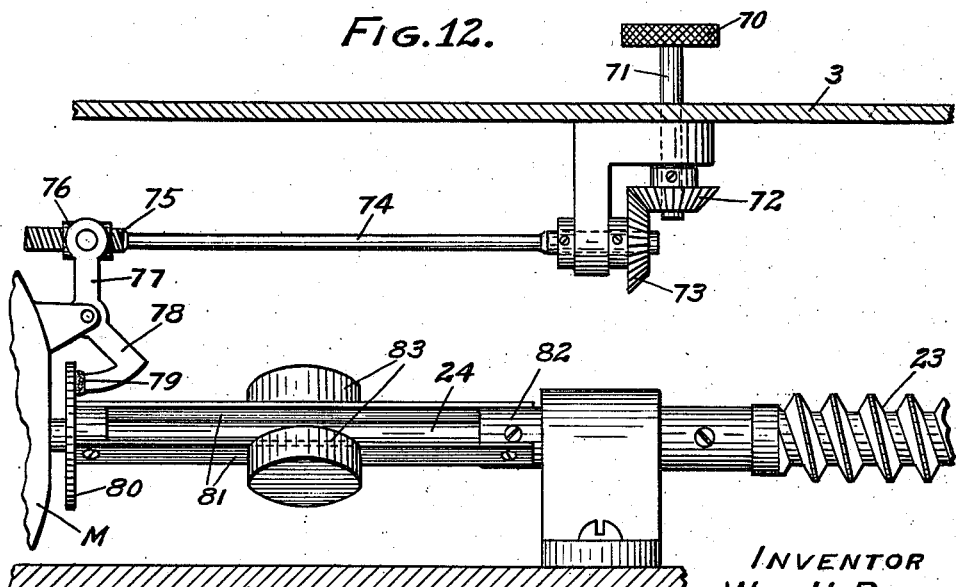
Fig. 12 is a vertical section and side elevation, showing the motor shaft governor to regulate the speed of the machine.

Any suitable means may be employed to regulate the speed of the turn-tables and this may conveniently consist of a brake device acting on the motor governor. In Fig. 12 there is shown a thumb wheel 70 on the shaft 71, above the top plate 3. On the lower end of the shaft is a gear 72, engaging another gear 73 fixed on the worm shaft 74, the worm 75 of which engages a threaded nut member 76. This member is pivoted in the arm 77 of a brake lever 78, which carries a friction shoe 79. This shoe engages a disc 80 attached to spring bars 81, connected to a sleeve 82, fixed on the motor shaft. The spring bars 81 have weights 83, so that, during operation centrifugal force tends to spring the links or bars 81 outwardly and thus draw the brake disc 80 against the brake shoe 79, the friction of which, therefore, retards the rotation of the motor shaft and the mechanism driven thereby.

When the tone arm is elevated by the upward movement of the record disc, the toe of the leg is lifted over the top of the restraining dog so that the tone arm is then free to rotate under the control of the grooves of the record.

When the table descends with the record, the tone arm swings down and the foot pin engages the top of its carrier, which holds the needle just above the top plane of the records on the table so that the needle can swing over one record to the next without scratching the faces thereof.

Further embodiments, modifications and changes may be resorted to within the spirit of the invention as here claimed.

What is claimed is:

1. A phonograph comprising a circular series of record supports, operating means therefor, a reproducer mounted concentrically within said series of supports, means operating automatically to move the reproducer successively from one record to another, said supports including turn-tables lying in a common plane when in inoperative position and means for elevating the supports.

2. A phonograph comprising a circular series of record supports, means for rotating said supports successively, a reproducer mounted concentrically within said circular series of supports, means for moving said reproducer successively from one record support to another, and means for successively elevating each record support.

3. A phonograph comprising a circular series of record supports, means for rotating said supports successively, a reproducer mounted concentrically within said circular series of supports, means for moving said reproducer successively from one record support to another, and means for successively elevating each record support, the rotating means being effective upon the elevated supports.

4. A phonograph comprising a circular series of record supports, means for rotating said supports successively, a reproducer mounted concentrically within said circular series of supports, means for moving said reproducer successively from one record support to another, and means for successively elevating each record support, the rotating means being effective upon the elevated supports, said elevating means being operative to lift each support for a predetermined period.

5. A phonograph comprising a circular series of record supports, means for rotating said supports successively, a reproducer mounted concentrically within said circular series of supports, means for moving said reproducer successively from one record support to another, means for successively elevating each record support, the rotating means being effective upon the elevated supports, said elevating means being operative to lift each support for a predetermined period, and having means for holding each support in elevated position for periods of different lengths of time.

6. A phonograph comprising a circular series of record supports, all resting, when inoperative, in a common plane, driving means common to all of said supports, means operating automatically to elevate said supports into and remove them from operative relation to said driving means successively, and a reproducer mounted above said supports to engage records thereon.

7. A phonograph comprising a circular series of record supports, all resting, when inoperative, in a common plane, driving means common to all of said supports, means operating automatically to elevate said supports into and remove them from operative relation to said driving means successively, a reproducer mounted above said supports to engage records thereon, and means operative automatically to shift the reproducer successively from support to support.

8. A phonograph comprising a circular series of horizontally arranged record supports, each disposed, when idle, in a common plane, a swinging reproducer arranged above the said supports, means for automatically shifting the reproducer successively from one support to another, a common drive device for the supports, and means for successively raising the supports and operatively connecting the same with said common drive device.

9. A phonograph comprising a circular series of horizontally arranged record supports, each disposed, when idle, in a common plane, a swinging reproducer arranged above the said supports, means for automatically shifting the reproducer successively from one support to another, a common drive device for the supports, and means for successively raising the supports, and operatively connecting the same with said common drive device, said shifting means and said elevating means operating constantly and at differential rates of speed so that the reproducer is carried to a predetermined position prior to the lifting of the record support thereat.

10. A phonograph comprising a circular series of horizontally arranged record supports, each disposed, when idle, in a common plane, a swinging reproducer arranged above the said supports, means for automatically shifting the reproducer successively from one support to another, a common drive device for the supports, means for successively raising the supports and operatively connecting the same with said common drive device, and means for stopping the swinging reproducer at a predetermined location over each record support.

11. A phonograph comprising a circular series of horizontally arranged record supports, each disposed, when idle, in a common plane, a swinging reproducer arranged above the said supports, means for automatically shifting the reproducer successively from one support to another, a common drive device for the supports, means for successively raising the supports and operatively connecting the same with said common drive device, and means for stopping the swinging reproducer at a predetermined location over each record support, said means providing for the stopping of a reproducer at either of two positions over a support according to the diameter of the record to be engaged by the reproducer.

12. A phonograph comprising a circular series of horizontally arranged record supports, each disposed, when idle, in a common plane, a swinging reproducer arranged above the said supports, means for automatically shifting the reproducer successively from one support to another, a common drive device for the supports, means for successively raising the supports and operatively connecting the same with said common drive device, and means for stopping the swinging reproducer at a predetermined location over each record support, said means including an adjustable stop operatively set by the application of a large record.

13. A phonograph comprising a circular series of horizontally arranged record supports, each disposed, when idle, in a common plane, a swinging reproducer arranged above the said supports, means for automatically shifting the reproducer successively from one support to another, a common drive device for the supports, means for successively raising the supports and operatively connecting the same with said common drive device, means for stopping the swinging reproducer at a predetermined location over each record support, said means including an adjustable stop operatively set by the application of a large record, and a fixed stop in a position subsequent to the position of the adjustable stop, for limiting the movement of the reproducer to position it for engagement with a small record.

14. A phonograph comprising a circular series of horizontally arranged record supports, each disposed, when idle, in a common plane, a swinging reproducer arranged above the said supports, means for automatically shifting the reproducer successively from one support to another, a common drive device for the supports, means for successively raising the supports and operatively connecting the same with said common drive device, means for stopping the swinging reproducer at a predetermined location over each record support, said means including an adjustable stop operatively set by the application of a large record, and means for locking the adjustable stop for a predetermined period independently of the large record.

15. A phonograph comprising a circular series of record supports, each having a vertical spindle, a reproducer mounted above the plane of the supports in their retracted positions, means for automatically swinging the reproducer from one support to another to engage records thereon, and cam means operatively combined with the said spindles for selectively elevating the same.

16. A phonograph comprising a circular series of record supports, each having a vertical spindle, a reproducer mounted above the plane of the supports in their retracted positions, means for automatically swinging the reproducer from one support to another to engage records thereon, a cam means operatively combined with the said spindles for selectively elevating the same, and a common tripping member successively engaging said cam means so as to operate the same to elevate the spindles and their records.

17. A phonograph comprising a circular series of record supports, each having a vertical spindle, a reproducer mounted above the plane of the supports in their retracted positions, means for automatically swinging the reproducer from one support to another to engage records thereon, a cam means operatively combined with the said spindles for selectively elevating the same, and a common tripping member successively engaging said cam means so as to operate the same to elevate the spindles and their records, said tripping member providing for the holding of the spindles and supports in elevated positions for variable periods of time, according to the length of the record groove on the record engaged by the reproducer.

18. A phonograph comprising a circular series of record supports, each having a vertical spindle, a reproducer mounted above the plane of the supports in their retracted positions, means for automatically swinging the reproducer from one support to another to engage records thereon, a cam means operatively combined with the said spindles for selectively elevating the same, and a common tripping member successively engaging said cam means so as to operate the same to elevate the spindles and their records, said tripping member providing for the holding of the spindles and supports in elevated positions for variable periods of time, according to the length of the record groove on the record engaged by the reproducer, said cam means including an adjustable tripping lug engageable by the tripping member.

19. A phonograph comprising a circular series of record supports, each having a vertical spindle, a reproducer mounted above the plane of the supports in their retracted positions, means for automatically swinging the reproducer from one support to another to engage records thereon, a cam means operatively combined with the said spindles, for selectively elevating the same, and a common tripping member successively engaging said cam means so as to operate the same to elevate the spindles and their records, said tripping member providing for the holding of the spindles and supports in elevated positions for variable periods of time, according to the length of the record groove on the record engaged by the reproducer, said cam means including an adjustable tripping lug engageable by the tripping member, said tripping member being provided with concentric zones of contact, each zone of different length, and with which said tripping lug is designed to selectively co-operate.

In testimony whereof I have signed my name to this specification.

WILLIAM H. DAILY.